Figure 1:
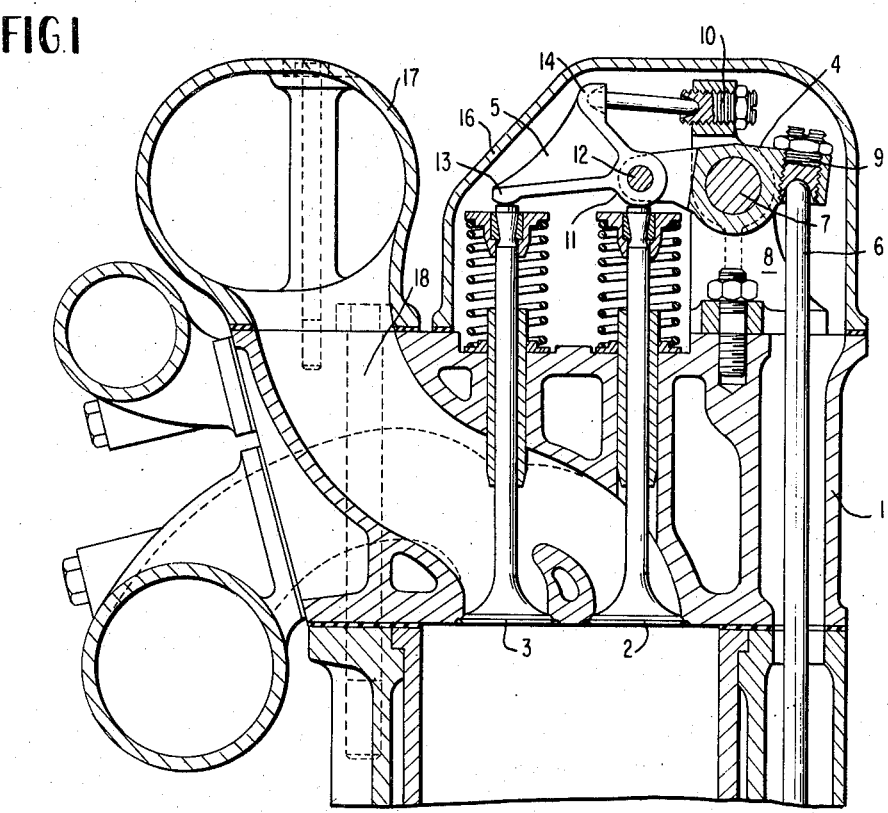

Sept. 28, 1965     A. PORTMANN     3,208,440
PARALLEL VALVE CONTROL
Filed April 3, 1964

INVENTOR
AUGUST PORTMANN

BY *T. V. Michaelis*
ATTORNEY

United States Patent Office 3,208,440
Patented Sept. 28, 1965

3,208,440
PARALLEL VALVE CONTROL
August Portmann, Arbon, Switzerland, assignor to
Adolph Saurer Ltd., Arbon, Switzerland
Filed Apr. 3, 1964, Ser. No. 357,096
Claims priority, application Switzerland, Apr. 5, 1963,
4,385/63
3 Claims. (Cl. 123—90)

This invention relates to internal combustion engines, and more particularly to actuation of two valves operating in parallel. Specifically, it involves actuation of a primary and a secondary valve arranged to operate in parallel by means of a pressure member common to both valves and pivotally mounted on a valve rocker.

In internal combustion engines provided with two intake and two exhaust valves, it is known to arrange, for the purpose of improving turbulence in the cylinder, two intake valves in series, i.e., to the left and to the right of the longitudinal axis of the engine. The disposition of the exhaust valves is similar to that of the intake valves. Actuation of the valves usually requires a second lever mounted on a secondary lever shaft. Such a secondary lever shaft adds considerably to the cost of the engine and moreover, takes up a lot of space. The valve rocker cover must be very wide, the more so as in most instances it must also extend across the cylinder head screws.

Other arrangements are known wherein the two valves are actuated by one pressure member. Approximately parallel guidance of this pressure member is disposed between the two valves springs. Arrangements of this kind, however, suffer from a number of disadvantages. With smaller engines the space between the valve springs is quite restricted. Also, at least for one of the valves the means for adjusting the valve operation must be disposed in the pressure member, thus resulting in a large moving mass. Moreover, the fulcrum on the valve rocker must be disposed between the valve springs lest large frictional forces occur on the guide member between the valve springs. This, however, in turn results in moving the push rod quite far from the cylinder, due to the lever ratio of the valve rocker which is fixed within narrow limits, thus leading to large, heavy engines and large cylinder head gaskets.

It is a primary object of the present invention to eliminate the multiple drawbacks inherent in the prior art arrangements discussed above, and to provide a system of actuating a primary and a secondary valve by means of a pressure member common to both which has none of these disadvantages.

Other objects and the means in which the same are attained will become apparent as this specification proceeds.

Pursuant to these objectives, the invention contemplates locating the fulcrum of the pressure member which is pivotally mounted on the valve rocker, at least approximately on an extension of the axis of the primary valve, and providing between the pressure member and the valve rocker bracket, an auxiliary member whereby the pressure member abuts against the valve rocker bracket, said member being adjusted in the direction of the rocking motion. This auxiliary member may be provided, preferably, in the form of a pressing rod or a roller; in case of the latter, the pressure member has a face which extends at least approximately in parallel to the valve axis and is disposed to abut against the roller.

In the drawing accompanying this specification and forming part thereof, two embodiments of the invention are shown diagrammatically by way of example, and with illustrative rather than any limitative intent.

Figure 2:
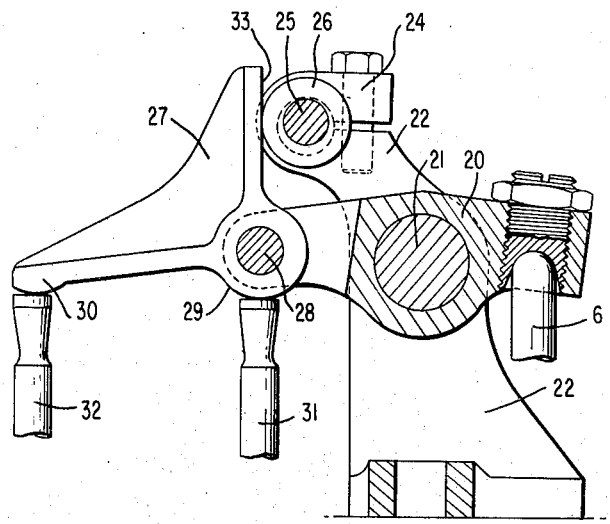

In the drawing,
FIG. 1 is a section through the cylinder head of an internal combustion engine showing means according to the invention, for actuating two valves, and
FIG. 2 is a sectional showing on a larger scale, of part of an arrangement such as shown in FIG. 1, however, modified in accordance with a second embodiment of the invention.

Referring to the drawing and first to FIG. 1, this shows a cylinder head 1 and two overhead valves 2 and 3 arranged therein for displacement parallel to one another. The primary valve, 2, and the secondary valve, 3, are actuated, via the valve rocker 4, and the pressure member 5, by the push rod 6. Valve rocker 4 is mounted for rocking displacement, by means of a pivot 7, on the valve rocker bracket 8. At its free end valve rocker 4 is provided with a setscrew 9. Another setscrew, 10, is disposed at the top of valve rocker bracket 8.

The pressure member 5 has a triangular configuration and is mounted for rocking displacement on the valve rocker 4, by means of eye 11 and pin 12. The pressure member 5 is provided with thickened portions 13 and 14. The eye 11 and thickened portion 13 rest on valves 2 and 3, respectively. A pressing rod 15 seated in the thickened portion 14 causes the pressure member 5 to be supported on valve rocker bracket 8. The valve action of valves 2 and 3 can be adjusted by means of setscrews 9 or 10, respectively.

If the valve rocker 4 and the guide rod 15 form part of a true parallelogram, the movement of the secondary valve 3 corresponds precisely to that of the primary valve 2. If for some reason, e.g. due to a longer or shorter pressing rod 15, no true parallelogram is effected, the deviation of the movement of the secondary valve 3 from that of the primary valve 2 is nevertheless, quite small.

The arrangement according to the invention as illustrated in FIG. 1, renders the valve rocker cover 16 quite narrow and thus permits the intake manifold to be disposed above the cylinder head 1 which in turn, results in an advantageous configuration of the intake channel 18.

Referring now to the embodiment of the invention shown in FIG. 2, the push rod 6 is arranged to actuate a valve rocker 20 which is mounted for rocking displacement, on a pivot 21 supported in valve rocker bracket 22. The valve rocker bracket 22 is provided, in its top extremity, with an excentric shaft 25 adjustably mounted by means of screws 24, a roller 26 being supported on excentric shaft 25. The pressure member 27 is mounted by means of a pivot 28 on the valve rocker 20 and has an eye 29 and a thickened portion 30, said eye and said thickened portion resting on valves 31 or 32, respectively. The fulcrum of the pressure member 27 is disposed on an extension of the longitudinal axis of valve 31. The face 33 on the pressure member 27 which abuts against the roller 26, extends at least approximately parallel to the longitudinal axis of valve 31.

The embodiment of the invention according to FIG. 2 secures the same important advantages as the device illustrated in FIG. 1.

I wish it to be understood that I do not desire to be limited to the details of construction, design, and operation shown and described, as modifications within the scope of the appended claims and involving no departure from the spirit of the invention nor any sacrifice of the advantages thereof, may occur to workers in this field.

I claim:
1. In an internal combustion engine of the kind including a cylinder head and disposed therein, a primary and a secondary valve operating in parallel, and means for actuating said valves including a valve rocker bracket mounted on the cylinder head, a valve rocker mounted for rocking displacement on said bracket, and a pressure member common to both said valves pivotally mounted on said valve rocker, the improvement which comprises:

(a) a pivot for the pressure member so arranged on the valve rocker as to be disposed substantially on a extension of the axis of the primary valve, (b) an auxiliary member interposed between and in engagement with said pressure member and said said valve rocker bracket, said auxiliary member being provided in the form of a roller, and (c) adjustable means at the point of engagement between said auxiliary member and said valve rocker bracket for controlling the abutment of said pressure member against said secondary valve.

2. In an internal combustion engine of the kind including a cylinder head and disposed therein, a primary and a secondary valve operating in parallel, and means for actuating said valve including a valve rocker bracket mounted on the cylinder head, a valve rocker mounted for rocking displacement on said bracket, and a pressure member common to both said valves pivotally mounted on said valve rocker, the improvement which comprises:

(a) a pivot for the pressure member so arranged on the valve rocker as to be disposed substantially on an extension of the axis of the primary valve, (b) an auxiliary member interposed between and in engagement with said pressure member and said valve rocker bracket, said auxiliary member being provided in the form of a roller, said pressure member including a face extending substantially parallel to the axis of the primary valve, said face being arranged to abut against said roller, and (c) adjustable means at the point of engagement between said auxiliary member and said valve rocker bracket for controlling the abutment of said pressure member against said secondary valve.

3. In an internal combustion engine of the kind including a cylinder head and disposed therein a primary and a secondary valve operating in parallel, and means for actuating said valves including a valve rocker bracket mounted on the cylinder head, a valve rocker mounted for rocking displacement on said bracket, a push rod abutting against said valve rocker, and a pressure member common to both said valves pivotally mounted on said valve rocker, the improvement which comprises:

(a) a pivot for the pressure member so arranged on the valve rocker as to be disposed substantially on an extension of the axis of the primary valve, (b) an auxiliary member interposed between and in engagement with said pressure member and said valve rocker bracket, (c) adjustable means mounted on the side of said valve rocker remote from the valves for controlling the abutment of said push rod against said valve rocker, and (d) adjustable means at the point of engagement between said auxiliary member and said valve rocker bracket for controlling the abutment of said pressure member against said secondary valve.

References Cited by the Examiner

UNITED STATES PATENTS 1,198,155  9/16  Schenker _____ 123—90

MARK NEWMAN, *Primary Examiner.*

FRED E. ENGELTHALER, *Examiner.*